United States Patent [19]
Thackston et al.

[11] 3,794,335
[45] Feb. 26, 1974

[54] DEVICES FOR ATTACHING ACCESSORIES

[75] Inventors: Clyde David Thackston, Columbia, S.C.; Jack Kasabian, Frankville, Wis.

[73] Assignee: Rockwell International Corporation, Pittsburgh, Pa.

[22] Filed: May 19, 1972

[21] Appl. No.: 255,249

Related U.S. Application Data

[63] Continuation of Ser. No. 7,068, Jan. 30, 1970, abandoned.

[52] U.S. Cl. .................................................. 279/23
[51] Int. Cl. ................................................ B23b 31/10
[58] Field of Search...... 279/23, 1 M, 1 E, 102, 103

[56] References Cited
UNITED STATES PATENTS

| | | | |
|---|---|---|---|
| 2,570,570 | 10/1951 | Lee | 279/23 |
| 2,301,981 | 11/1942 | Steffens | 279/1 ME |
| 2,539,610 | 1/1951 | Bunch | 279/23 X |
| 2,559,895 | 7/1951 | Norlander | 279/23 |
| 2,564,893 | 8/1951 | Gibbons | 279/23 |

FOREIGN PATENTS OR APPLICATIONS

| 649,750 | 1/1951 | Great Britain | 279/23 |
|---|---|---|---|

*Primary Examiner*—Francis S. Husar

[57] ABSTRACT

Devices for attaching accessories to the rotatable output members of tools in which the accessory is inserted in a chuck member which rotates with the tool output member and in which a spring in the chuck member fixes the accessory to the chuck member for rotation therewith.

6 Claims, 7 Drawing Figures

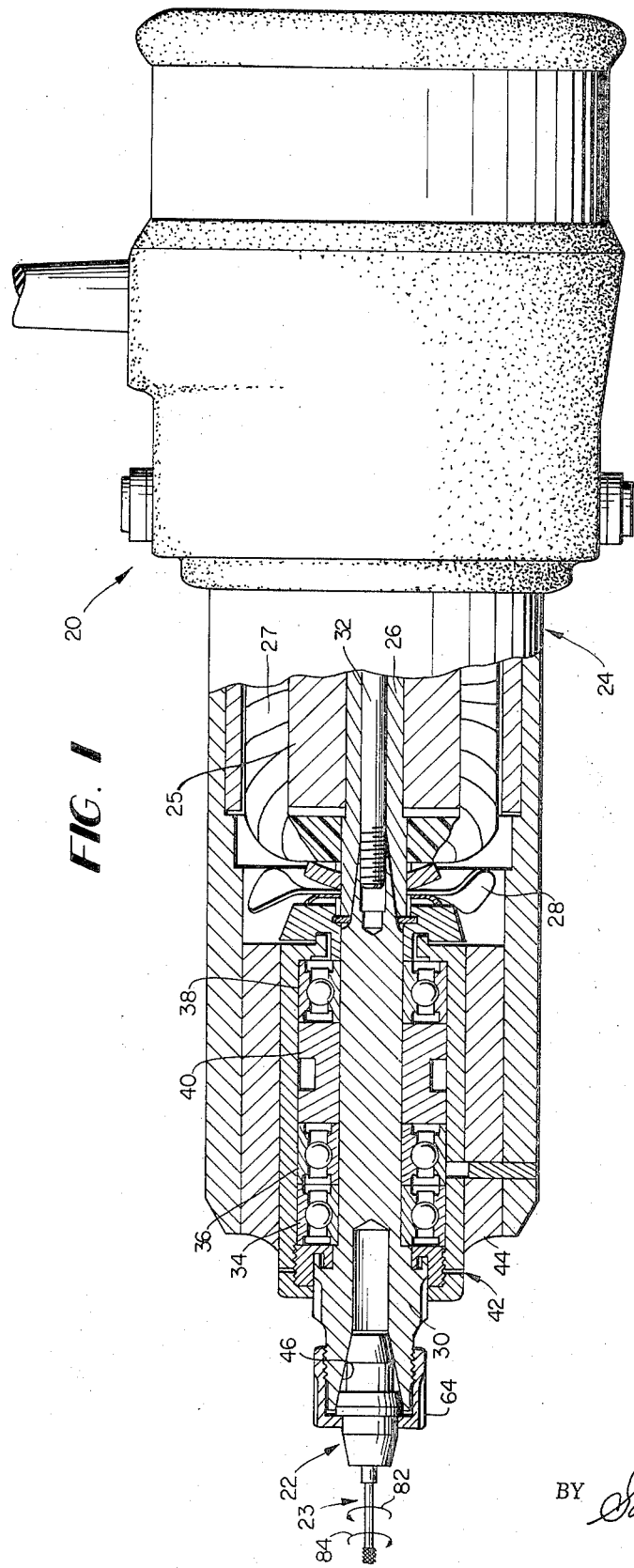
FIG. 1
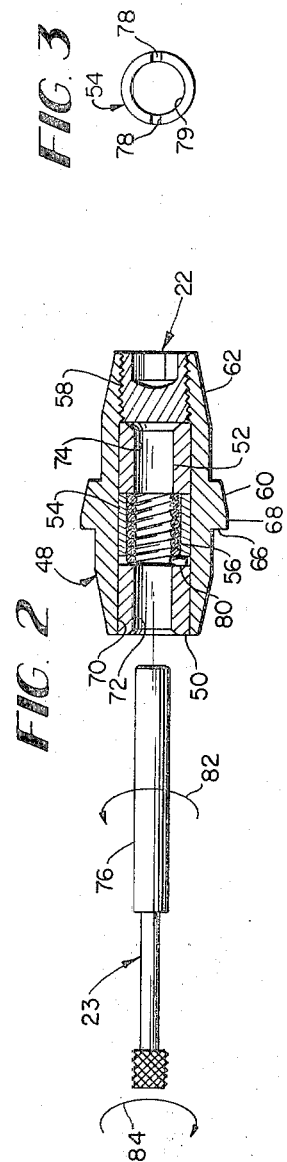
FIG. 2
FIG. 3
INVENTOR
CLYDE DAVID THACKSTON
JACK KASABIAN
BY *Strauch, Nolan, Neale, Nies & Kurz*
ATTORNEY

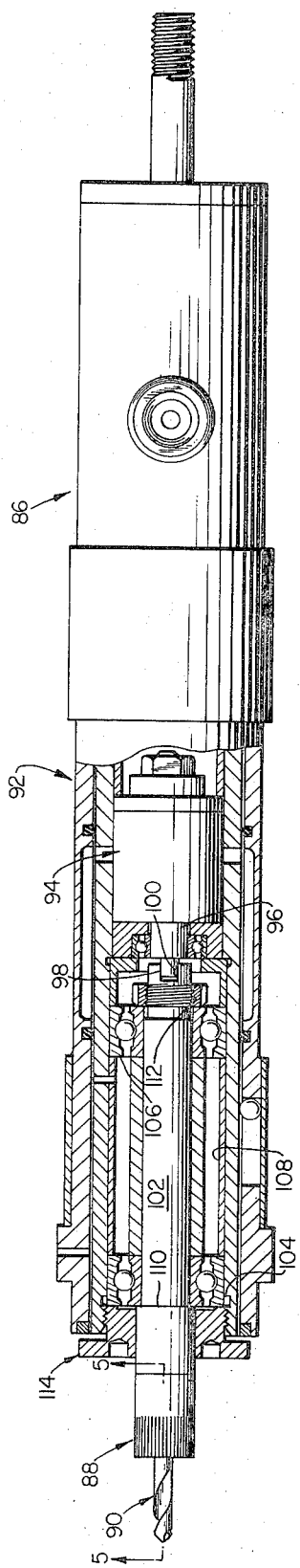
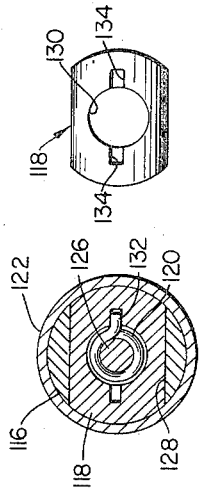
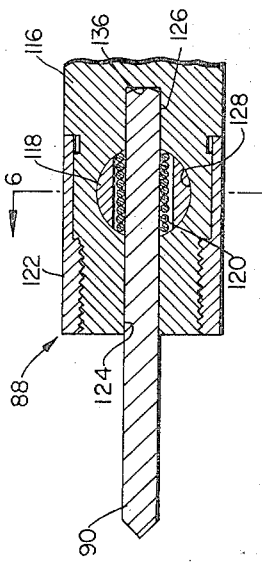
INVENTORS
CLYDE DAVID THACKSTON
JACK KASABIAN

DEVICES FOR ATTACHING ACCESSORIES

This application is a continuation of application No. 7,068 filed Jan. 30, 1970, which has been abandoned.

This invention relates to devices for attaching accessories and, more specifically, to devices for attaching accessories to shafts, spindles, and other rotary output members of power and other tools. (1. The term "accessory" as used herein is intended to embrace work-performing components such as drills, milling and grinding tools, routers, deburring tools, boring tools, saws, abrasive tools, polishing and other finishing tools, cutoff tools, etc. as well as other accessories which are typically mounted in chucks and collets such as flexible shafts, speed reducers, and angle drives, for example.)

Perhaps the most common device heretofore available for attaching accessories to the rotating output members of power quills, drills, and other tools (2. The devices of the present invention are particularly useful with high speed power tools such as power quills and the like, and the principles of the invention will accordingly be developed primarily by reference to such applications. As will become apparent from the description of the invention hereinafter, however, such devices may also be used to advantage with other types of power tools as well as hand tools.) is the conventional geared chuck. While satisfactory for many purposes this type of chuck does have several drawbacks. First, a geared chuck is not capable of holding a drill or other accessory chucking in it in precise longitudinal alignment with the output member to which the accessory is coupled by the chuck. Accordingly, a geared chuck is not satisfactory in applications requiring precision drilling, for example, since unacceptable runout will result. (3. The term "runout" is used herein as is conventional to designate the difference between the actual size of a drill bit and the size of the hole it produces.)

In addition changing bits is a relatively slow process when a geared chuck is employed since the chuck must be loosened and tightened with a key. This drawback is particularly significant in high output production operations and other applications where accessories have to be frequently replaced. (4. The several types of commercially available collets in general have the same drawbacks as geared chucks.)

For applications where precise alignment is required, a chuck consisting essentially of a body bored to form a sliding fit with the shank of a bit or other accessory which is secured in place by a setscrew has on occasion been employed. This arrangement, like a geared chuck, makes the replacement of accessories a relatively time-consuming project. Furthermore, the setscrew or other retainer tends to misalign the accessory by pressing it against the side of the bore in the chuck, which must be at least slightly larger than the shank of the accessory so that the latter can be removed and replaced.

We have now invented a novel arrangement for fixing accessories to tool output shafts which does not have the drawbacks of the devices just described. In particular our novel arrangement not only provides more precise alignment of the accessory but also facilitates its removal and replacement.

Our novel devices, which will generally be referred to hereinafter as "chucks" for the sake of convenience, can be produced in the form of an attachment or as an integral part of a spindle, arbor, or other rotary tool output member. These chucks include a member or body which is provided with a longitudinal or axial bore dimensioned to receive and have a close sliding fit with the shank of a drill bit or other accessory or to receive sleevelike inserts which will similarly cooperate with the accessory to precisely align it with the rotary output member of the tool with which the chuck is associated. Disposed in the chuck body in a position where it will surround the shank of the accessory is a free floating coil spring having an inside diameter which, when the spring is relaxed, is slightly smaller than that of the shank of the accessory. One end of the spring is fixed against rotation relative to the chuck body.

An accessory is mounted in a chuck of the type just described by sliding its shank or corresponding portion into the bore in the chuck body while twisting the accessory in the spring-loosening direction, permitting the shank to be seated in the bore. In the subsequent absence of this twisting force, the coil spring relaxes, gripping the shank of the accessory to retain it in place.

The pitch of the coil spring is selected so that, in operation, the accessory will tend to rotate relative to the chuck body in a direction which even further tightens the spring on the accessory, fixing it to the chuck body for rotation therewith.

Removal of the accessory is as simple as mounting it in the chuck. The accessory is simply twisted in the same direction as in mounting it and pulled out of the chuck body.

One advantage of the present invention is the ease with which accessories may be mounted and removed. Another important advantage is that very precise axial alignment of the bit or other accessory may be obtained by the sliding fit of the accessory in the chuck body and because the gripping forces exerted by the free floating spring to retain the accessory in the chuck body are not asymmetrical as is the case when a setscrew or the like is employed. In fact, because the spring is free floating, it exerts no lateral or bending forces at all on the shank of the accessory to disturb the alignment, which is effected solely by the bore or bores in which the shank is seated.

Another advantage of the present invention is its versatility. It can be produced as an attachment which can be substituted directly for a conventional chuck or collet or as an integral part of a rotary tool output member. Also, our novel chucks are simple and are of a design which lends itself to mass production techniques. Both of these factors are of course important from an economic point-of-view. Also, our novel chucks can be made very small and compact, which is an advantage for applications of the invention where space is limited.

The use of coil springs as locking devices has heretofore been proposed (see U.S. Pat. Nos. 2,808,903 issued Oct. 8, 1957; 3,006,448 issued Oct. 31, 1961; and 3,249,180 issued May 3, 1966). However, as far as we know, coil springs have not been so employed in any setting even remotely resembling that just described.

From the foregoing it will be apparent that the primary object of this invention is the provision of novel, improved devices for rotatively securing accessories as hereinbefore characterized to the rotary output shafts of power and other tools.

Other important but more specific objects of the invention reside in the provision of devices in accord with the primary object which:

1. provide precise axial alignment of the accessory.

2. facilitate the chucking or mounting and removal of accessories.

3. are versatile.

4. have a design which is simple and which lends itself well to fabrication by mass production techniques.

5. have various combinations of the attributes described in items (1) through (4).

Yet another important, specific object of the invention lies in the provision of devices in accord with the primary object which include a body axially bored to receive a correspondingly configured portion of the accessory and a free floating coil spring mounted in the bore which is capable of gripping the accessory and rotatively fixing it to the chuck body.

Other objects and advantages of the present invention as well as other important features will become apparent from the appended claims and as the ensuing detailed description and discussion proceeds in conjunction with the accompanying drawing, in which:

FIG. 1 is a side view of a power quill equipped with an accessory attaching device or chuck constructed in accord with the principles of the present invention, a double cut milling tool being mounted in the chuck and part of the quill casing being broken away to show certain of its internal components;

FIG. 2 is an exploded view of the milling tool and chuck of FIG. 1 to an enlarged scale, the chuck being shown in longitudinal section;

FIG. 3 is an end view of a spring supporting sleeve used in the chuck of FIG. 1;

FIG. 4 is a view similar to FIG. 1 of a power quill equipped with a second form of chuck constructed in accord with the present invention, a twist drill being secured in the chuck;

FIG. 5 is a section through the drill and chuck taken substantially along line 5—5 of FIG. 4;

FIG. 6 is a section through the chuck taken substantially along line 6—6 of FIG. 5; and FIG. 7 is a side view of a spring holding member employed in the chuck of FIG. 5.

Referring now to the drawing, FIG. 1 depicts a power quill 20 equipped with an accessory mounting device or chuck 22 constructed in accord with the principles of the present invention and fabricated in the form of an attachment. A double cut milling tool 23 is mounted in the chuck.

The illustrated power quill is a Model Super 65 which is commercially available from the Precise Products Division of Rockwell Manufacturing Company. It will accordingly not be described herein except to the extent necessary to provide a setting for and an understanding of the present invention.

Generally speaking, power quill 20 includes a casing 24 housing an electric motor having as its major components an armature 25 mounted on an armature or output shaft 26, a field assembly 27 and a fan 28. Shaft 26 is rotatably fixed to a quill 30 by an armature draw bolt 32 in a manner described in detail in U.S. Pat. No. 2,696,569 issued Dec. 7, 1954, which is hereby incorporated herein.

Quill 30, which constitutes the output member of tool 20, is rotatably supported in bearings 34, 36, and 38, the latter two being separated by a ringlike spacer 40. The quill, together with the bearings and spacer just described, is surrounded by a cylindrical retainer assembly identified generally by reference character 42. This assembly is mounted in a quill housing 44 in the front end of tool casing 24.

Formed in the forward or front end of quill 30 is a frustoconical seat 46. Conventionally, a chuck or collet is mounted in this seat.

The illustrated power quill is in many respects similar to the power quill illustrated and described in detail in U.S. Pat. No. 2,696,569. The reader may accordingly refer to this patent for information regarding the details of power quill 20 if deemed necessary for an understanding of the present invention.

Turning now to FIGS. 1–3, the novel chuck 22 referred to above includes a chuck body or member 48 housing alignment sleeves 50 and 52, a bushing 54 and a coil spring 56. A screw or plug 58 is threaded into the rear end of member 48 (i.e., the right-hand end of the member as shown in FIG. 2).

As shown in FIG. 1, chuck 22 is disposed in the seat 46 at the forward end of quill 30. Frustoconical surface portions 60 and 62 on the chuck are configured to match seat 46 and align the chuck with quill 30.

Chuck 22 is rotatably fixed to quill 30 by a chuck nut 64 threaded on the forward end of the quill. The chuck nut abuts a shoulder 66 provided by annular rib 68 on chuck member 48, forcing the chuck to the right as shown in FIG. 1 to frictionally connect it with quill 30.

The sleeves 50 and 52 and the bushing 54 referred to above are all press fitted into an axial or longitudinal bore 70 through chuck member 48. Sleeves 50 and 52 are cylindrical members having inside diameters or bores 72 and 74 so dimensioned that the shank 76 of cutter 23 is a smooth sliding fit in them. This arrangement provides precise alignment of the cutter with chuck body 48.

As shown in FIGS. 2 and 3, the bushing 54 disposed between sleeves 50 and 52 is also a cylindrical member. The bushing has notches 78 formed in its forward end (i.e., the left-hand end as shown in FIG. 2). Coil spring 56, which will have the illustrated left-hand pitch in a chuck employed with a tool utilizing conventional right-hand rotation, is disposed in the bore 79 through bushing 54 with one end 80 of the spring seated in a notch 78 to restrain it against rotation relative to the chuck body 48.

The outer diameter of spring 56 in its relaxed state is smaller than the bore 79 through bushing 54. Spring 56 accordingly floats freely in the bushing. This is important in that it keeps the spring from exerting on the cutter shank any forces which might tend to misalign the cutter. In other words, in the present invention, alignment of the accessory is accomplished solely by the use of sleeves 50 and 52, which permits this to be done with great precision.

As mentioned above, spring 56 embraces the shank 76 of cutter 23 to rotatably fix it to chuck body 48 and, through the latter, to quill 30. More particularly, cutter 23 is mounted in chuck 22 by sliding its shank 76 through the bores 72 and 74 in sleeve 50 and 52 until the right-hand end of the shank as shown in FIG. 2 abuts threaded plug 58. As the cutter is moved to the right as shown in this Figure, it is rotated or twisted in the direction indicated by arrow 82. This opens or expands spring 56, allowing shank 76 to be moved through the spring.

When cutter 23 is seated in chuck member 48 and the twisting force on the cutter released, spring 56 relaxes or contracts, gripping the cutter shank with a force which is of high enough magnitude to prevent the cutter from being manually pulled from the chuck body.

In the operation of tool 20 quill 30 rotates in the direction shown by arrow 82 in FIGS. 1 and 2. Due to the resisting force exerted by the engagement of the cutter or other accessory with a workpiece, for example, a resisting torque will be exerted on the cutter; and it will tend to rotate slower than quill 30. Therefore, the relative rotational movement between chuck body 48 and cutting tool 23 will be in the direction shown by arrow 84 in FIGS. 1 and 2. This will further tighten the spring on cutter shank 76 to rotatably fix it to the chuck body. (5. In tests of chucks of the type described above it has been found that the spring 56 will break before the shank will slip relative to the chuck body.)

The removal of the cutter or other accessory is as simple as its insertion and is accomplished in much the same fashion. Specifically, the accessory is simply twisted relative to chuck body 48 in the direction indicated by arrow 82 in FIGS. 1 and 2 to expand or open spring 56, and the accessory is simultaneously pulled out of the chuck body (i.e., to the left as shown in FIG. 2).

As indicated above, one of the important advantages of the present invention is the precision with which accessories can be aligned. In this regard chucks in accord with the invention have been found to align drill bits so accurately that the runout as much as three inches from the chuck (runout increases with the distance from the point of support or attachment) is less than 0.0002 inches.

Continuing, FIG. 4 illustrates an air motor powered precision quill 86 equipped with a second form of locking device or chuck 88 constructed in accord with the principles of the present invention. In this illustration, a conventional twist drill 90 is mounted in the chuck.

As in the case of the embodiment described previously, the details of the power quill itself are not part of the present invention and will accordingly not be described herein except to the extent necessary to develop the principles of the present invention. Briefly, however, power quill 86 includes a casing 92 housing a conventional air motor 94 having an output shaft 96. Shaft 96 terminates in a tongue 98, which extends into a cooperating groove 100 in the rear of a shaft or quill 102.

Quill 102 is rotatably supported by bearings 104 and 106 separated by a cylindrical spacer 108. The quill is retained in the bearings by a shoulder 110 at the rear or right-hand end of chuck 88 and a nut 112 threaded on the right-hand end of the quill. The quill, bearings 104 and 106, and bearing spacer 108 are mounted in a quill housing assembly 114 located in the front (or left-hand end as shown in FIG. 4) of casing 92.

In this embodiment of the invention chuck 88 is formed as an integral part of quill 102. This particular chuck includes a chuck member 116, a support member 118 in which a coil spring 120 is disposed, and a sleevelike retainer 122. Inasmuch as it is an integral part of quill 102, chuck body 116 may be precisely aligned with the quill.

The quill 90 or other accessory is aligned with the chuck body in an axial or longitudinal bore 124 in the latter. As in the embodiment described previously, this bore is dimensioned to provide a sliding fit with the shank 126 of the accessory to eliminate lateral movement of the accessory in the bore for all practical purposes.

As shown in FIGS. 5 and 6, chuck body 116 also has a transverse bore 128 so located that its longitudinal axial intersects the axis of bore 124. Spring mount 118, best shown in FIGS. 6 and 7, is disposed in bore 128 in which it is retained by the member 122 threaded on the forward end of chuck body 116 (the left-hand end in FIG. 5).

As shown in FIGS. 5-7, a bore 130 is formed through spring support 118. In the assembled chuck this bore is concentric with the bore 124 through chuck body 116.

With reference now to FIGS. 5 and 6, coil spring 120 is floatingly mounted in bore 130. One end 132 of the spring is disposed in a notch 134 in the spring mount to fix this end of the spring against rotation relative to chuck body 116.

Spring 120 is dimensioned relative to the shank 126 of drill bit 90 in the manner discussed previously, and the operation of the chuck including insertion and removal of the accessory and the gripping action of spring 120 in operation of power quill 86 is also as described above. That is, the accessory is inserted by moving it into chuck body bore 124 until it bottoms on the blind end 136 of the bore while twisting it to expand the spring. When this force is then removed, spring 120 relaxes or contracts to grip and retain the accessory in the chuck body. Removal is similarly accomplished with the accessory being pulled to the left rather than to the right as shown in FIG. 5. Moreover, as in the case of chuck 22, the pitch of spring 120 is so selected that the spring will tighten on the shank 126 of the accessory and rotatably fix it to chuck body 116 during operation of the power quill.

In the embodiments of the invention described and illustrated above the cutter, drill, or other accessory is aligned or piloted on both (or the front and rear) sides of the spring type retainer. While it is possible to pilot the accessory on one side only, the disclosed arrangement results in a much more precise asignment and accordingly a substantially greater reduction in runout. The above-described arrangement is accordingly preferred, especially in applications where precision is of importance.

As discussed previously, many accessories in addition to milling cutters and twist drills may be mounted in devices of the type described above. Moreover, devices of the type contemplated by the present invention, as also discussed, can be incorporated in a variety of power tools other than quills in the form of an attachment or an integral part of the tool output shaft. Further, as mentioned previously, devices of the type disclosed herein can be used in hand and other tools as well as power tools. Accordingly to the extent that such applications of the principles of the invention are not expressly excluded from the appended claims they are fully intended to be covered therein.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A chuck or the like comprising a chuck member having therein a longitudinally extending bore for receiving an accessory and a bore extending transversely therethrough which intersects said longitudinally extending bore; a coil spring disposed in said chuck member and adapted to surround the accessory received therein; and means fixing one end of said coil spring to said chuck member, whereby the exertion of a rotary force on an accessory disposed in said longitudicnally extending bore will tighten the spring against the accessory and thereby fix it to said chuck member for rotation therewith, the means fixing said one end of said spring to said chuck member comprising a member disposed in said transversely extending bore, said last-mentioned member having a bore therein in which said spring is disposed and a recess in which said one end of said spring is received.

2. The chuck of claim 1, together with means for retaining the member in which the spring is disposed in the longitudinally extending bore in the chuck member.

3. A tool comprising a shaft having therein a generally frustoconical recess opening onto one end of the shaft; means for rotating said shaft; an accessory having shank means; a chuck member having bore means in which the shank means of the accessory is disposed, an annular external rib with a surface facing said one end of said shaft and at least one external surface portion configured to match the recess in the shaft, said chuck being seated and rotatable in said recess about the axis of rotation of the shaft; means fixing said chuck member to said shaft for rotation therewith comprising a retainer threaded onto said one end of said shaft and engaging said surface of said rib to force said chuck member into said recess and into engagement with said shaft and thereby provide a frictional connection between the shaft and the chuck member, and said retainer being configured to contact only said surface of said shaft to thereby avoid the imposition of misalignment producing forces on said chuck member; and means disposed in the bore means in said chuck member in juxtaposition to the shank means of the accessory which is operable upon the exertion of a rotary force on said accessory in one direction relative to said chuck member to fix said accessory to said member for rotation therewith and operable upon the exertion of a relative rotary force in the opposite direction to release said accessory for removal from said chuck member.

4. The tool of claim 3, wherein said chuck member is a one-piece member, wherein said bore means comprises a pair of fixedly positioned, axially aligned, spaced apart bores in said one-piece chuck member which are adapted to have the accessory extend therethrough, each of said axially aligned bores having a length which exceeds its width and said bores being dimensioned to closely fit the portions of the accessory received therein, whereby said bores accurately align said accessory relative to the chuck member, and wherein the means disposed in said bore means for fixing the accessory to the chuck member for rotation therewith comprises a coil spring surrounding the shank means of the accessory and means fixing one end of said coil spring against rotation relative to said chuck member, whereby the accessory is aligned in the chuck member only by the fit of the accessory in the axially aligned bores in the chuck member.

5. The tool of claim 3, together with a pair of tightly fitted sleeves having longitudinally extending bores therethrough disposed in the bore means of said chuck member in axially aligned, spaced apart relationship to provide in said member a pair of axially aligned, spaced apart bores for receiving the shank means of said accessory, said axially aligned bores being dimensioned to closely fit the portions of the accessory shank received therein to thereby accurately align said accessory relative to the chuck member; and wherein the means for fixing the accessory to the chuck member for rotation therewith comprises a coil spring disposed in said chuck member between said sleeves, said spring being dimensioned to have the accessory shank extend therethrough, and means fixing one end of said coil spring against rotation in said chuck member, whereby the exertion of a rotary force on the shank of the accessory will tighten the spring against the accessory and thereby fix it to said chuck member for rotation therewith, said spring being dimensioned to fit freely in said chuck member when it is tightened around the accessory shank, whereby the accessory is aligned in the chuck member only by the fit of the accessory shank in the axial aligned bores in said sleeves.

6. The tool of claim 5, wherein the means for fixing said one end of said coil spring against rotation in the chuck member comprises a bushing surrounding the spring and fixed against rotation relative to said chuck member, said bushing being disposed between said sleeves, and there being a recess in said bushing in which said one end of said spring is disposed.

* * * * *